United States Patent [19]
Becker et al.

[11] Patent Number: 5,305,444
[45] Date of Patent: Apr. 19, 1994

[54] APPARATUS FOR INCREASING THE NUMBER OF HITS IN A TRANSLATION LOOKASIDE BUFFER INCLUDING INSTRUCTION ADDRESS LOOKASIDE REGISTER

[75] Inventors: Robert Becker, Shirley; Peter Mehring, Wilmington, both of Mass.

[73] Assignee: Sun Microsystems, Inc., Mountain View, Calif.

[21] Appl. No.: 633,460

[22] Filed: Dec. 21, 1990

[51] Int. Cl.$^5$ .................. G06F 12/00; G06F 12/10
[52] U.S. Cl. .................................. 395/400; 395/425
[58] Field of Search .............................. 395/400, 425

[56] References Cited

U.S. PATENT DOCUMENTS

| | | | |
|---|---|---|---|
| 4,400,774 | 8/1983 | Toy | 395/425 |
| 4,453,230 | 6/1984 | Mizoguchi et al. | 395/400 |
| 4,577,293 | 3/1986 | Matick et al. | 365/230.03 X |
| 4,860,192 | 8/1989 | Sachs et al. | 395/400 |
| 4,905,141 | 2/1990 | Brenza | 395/425 |
| 4,933,837 | 6/1990 | Freidin | 395/375 |
| 5,060,137 | 10/1991 | Bryg et al. | 395/200 |
| 5,091,846 | 2/1992 | Sachs et al. | 395/250 |
| 5,133,058 | 7/1992 | Jensen | 395/400 |
| 5,165,028 | 11/1992 | Zulan | 395/400 |

OTHER PUBLICATIONS

Intel Cache Tutorial, Chapter 2, "Basic Cache Architecture" 1990 pp. 2-21, 2-22.
"Computer Architecture A Quantitative Approach" by David A. Patterson, Morgan Kaufmann Publication, 1990 pp. 475-480.
"A VLSI Chip Set for a High-Performance VAX" by Richard R. Heye, Oct., 1985, Proceedings IEEE Intl Conf. on Computer Design, pp. 347-352.

*Primary Examiner*—Joseph L. Dixon
*Assistant Examiner*—Michael A. Whitfield
*Attorney, Agent, or Firm*—Blakely, Sokoloff, Taylor & Zafman

[57] ABSTRACT

A translation lookaside buffer for caching virtual addresses from a plurality of sources along with the associated physical addresses which physical addresses must be rapidly accessable and in which virtual addresses may appear simultaneously from two of the sources requiring translation into physical addresses, including a primary cache for storing a plurality of individual virtual addresses and associated physical addresses from all of the plurality of sources, apparatus for storing a single virtual address and its associated physical address from one of the plurality of sources which occurs most often each time a virtual address and an associated physical address from that one of the plurality of sources is referenced in the primary cache, and apparatus for ascertaining whether the virtual address held in the apparatus for storing a single virtual address and an associated physical address is a virtual address sought when an attempt is made to access the primary cache for a virtual address from the one of the plurality of sources and for another of the plurality of sources simultaneously.

7 Claims, 2 Drawing Sheets

APPARATUS FOR INCREASING THE NUMBER OF HITS IN A TRANSLATION LOOKASIDE BUFFER INCLUDING INSTRUCTION ADDRESS LOOKASIDE REGISTER

BACKGROUND OF THE INVENTION

1. Field Of The Invention.

This invention relates to computer memory management units and, more particularly, to apparatus for increasing the number of hits which occur in a translation lookaside buffer portion of a memory management unit.

2. History Of The Prior Art

A virtual memory system is one which allows addressing of very large amounts of memory as though all of that memory were the main memory of the computer system even though actual main memory may consist of some substantially lesser amount of storage space. For example, main memory may consist of one megabyte of random access memory while sixty-four megabytes of memory are addressable using the virtual memory addressing system.

Virtual memory systems accomplish this feat by providing memory management units which translate virtual memory addresses into physical memory addresses. A particular physical address may be in main memory or in long term storage. If the physical address of information sought is in main memory, the information is accessed and utilized by the computer. If the physical address is in long term storage, the information is transferred to main memory where it may be used.

The basic memory management unit uses lookup tables which are stored in main memory. Any virtual address presented to the memory management unit is compared to the values stored in these tables to determine the physical address to access. There are often several levels of tables, and the comparison takes a great deal of system clock time.

To overcome this delay, virtual memory systems often include cache memories which use very fast components to store recently used data and instructions. These cache memories are usually connected so that they are rapidly accessible to the processors. These caches are first looked to by a processor before going to main memory for any information. The theory of these caches is that information most recently used is more likely to be needed again before other information is needed. This theory is valid, and many systems using cache memories have hit rates of over ninety percent.

These cache memories must also be addressed to obtain the information they contain. If these caches are addressed using physical addresses, then address translation is required before they may be accessed. To accomplish this without going through the page lookup tables, a typical memory management unit uses a translation lookaside buffer (TLB) to cache virtual page addresses which have been recently accessed along with their related physical page addresses. Such an address cache works on the same principle as do caches holding data and instructions, the most recently used addresses are more likely to be used than are other addresses. When provided a virtual address which it holds, the translation lookaside buffer furnishes a physical address for the information. If that physical address is in the related cache, then the information is immediately available to the processor without the necessity of going through the time consuming process of referring to the page lookup tables in main memory.

If when the processor sends a virtual address to the translation lookaside buffer, the address is not included in the translation lookaside buffer, then the memory management unit must retrieve the physical address using the lookup tables in main memory. When the physical address is recovered, it is stored along with the virtual address in the translation lookaside buffer so that the next time it is needed it is immediately available. When the information is recovered, it is stored in the cache under the physical address. This saves a great deal of time on the next use of the information because a typical lookup in the page tables may take from ten to fifteen clock cycles at each level of the search, while accessing the information using the translation lookaside buffer and the caches may require only one or two clock cycles.

U.S. patent application Ser. No. 07/631,966, entitled TRANSLATION LOOKASIDE BUFFER, filed Dec. 21, 1990, and assigned to the assignee of this invention, describes a translation lookaside buffer for a very fast RISC computer system which provides separate caches for data and for instructions. In a typical prior art computer system these different virtual addresses would be translated by separate hardware resources. The translation lookaside buffer described, however, stores virtual and physical addresses for data, instructions, and input/output operations. Such a translation lookaside buffer allows the very rapid translation of all virtual addresses which might be used by a system with a very minimum amount of hardware. Such a system is well adapted to be used in a system in which most of the hardware is resident on a single chip.

One problem which occurs in a system which uses physical addressing for instruction and data caches and which processes data, instruction, and input/output addresses through a single translation lookaside buffer is occasioned by the fact that addresses for data, instructions, and input/output operations may all contest for the translation lookaside buffer at the same time. When this occurs, the system must somehow provide for translating all of the addresses. If the translations are done serially, significant delays occurs. The provision of a separate translation lookaside buffer to handle the overflow adds a great deal of hardware which the aforementioned invention was designed to eliminate. Other possibilities such as prefetching instructions or speeding the operation of the translation lookaside buffer offer other undesirable levels of complication.

SUMMARY OF THE INVENTION

It is, therefore, an object of the present invention to provide an arrangement for speeding the operation of translating circuitry used for handling information from two individual sources which may provide information concurrently.

It is another more specific object of the present invention to increase the speed of operation of a translation lookaside buffer used as the single address cache for a processor having individual data and instruction caches.

It is yet another object of the present invention to increase the speed of operation of a translation lookaside buffer used as the single address cache for a processor having individual data and instruction caches and also storing input/output addresses without significantly increasing the hardware.

These and other objects of the present invention are realized in a translation lookaside buffer for caching virtual addresses from a plurality of sources along with the associated physical addresses which physical addresses must be rapidly accessible and in which virtual addresses may appear simultaneously from two of the sources requiring translation into physical addresses, comprising a primary cache for storing a plurality of individual virtual addresses and associated physical addresses from all of the plurality of sources, means for storing a single virtual address and its associated physical address from one of the plurality of sources which occurs most often each time a virtual address and an associated physical address from that one of the plurality of sources is referenced in the primary cache, and means for ascertaining whether the virtual address held in the means for storing a single virtual address and an associated physical address is a virtual address sought when an attempt is made to access the primary cache for a virtual address from the one of the plurality of sources and for another of the plurality of sources simultaneously.

These and other objects and features of the invention will be better understood by reference to the detailed description which follows taken together with the drawing in which like elements are referred to by like designations throughout the several views.

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. In all cases the distinction between the method operations in operating a computer and the method of computation itself should be borne in mind. The present invention relates to apparatus for operating a computer in processing electrical or other (e.g. mechanical, chemical) physical signals to generate other desired physical signals.

DETAILED DESCRIPTION OF THE INVENTION

Figure 1A:
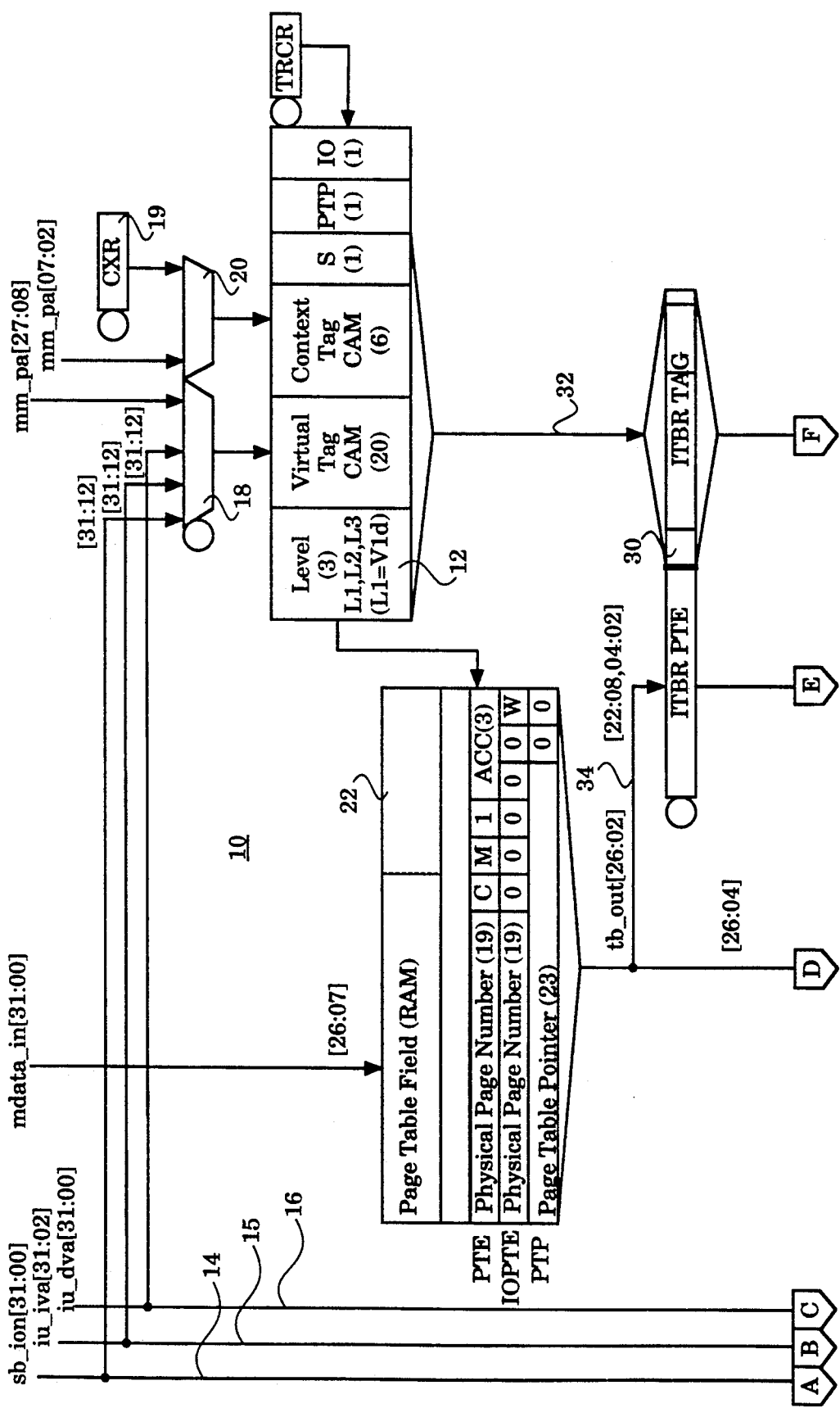
FIGS. 1(a) and 1(b) are block diagrams of a translation lookaside buffer designed in accordance with the present invention.
Figure 1B:
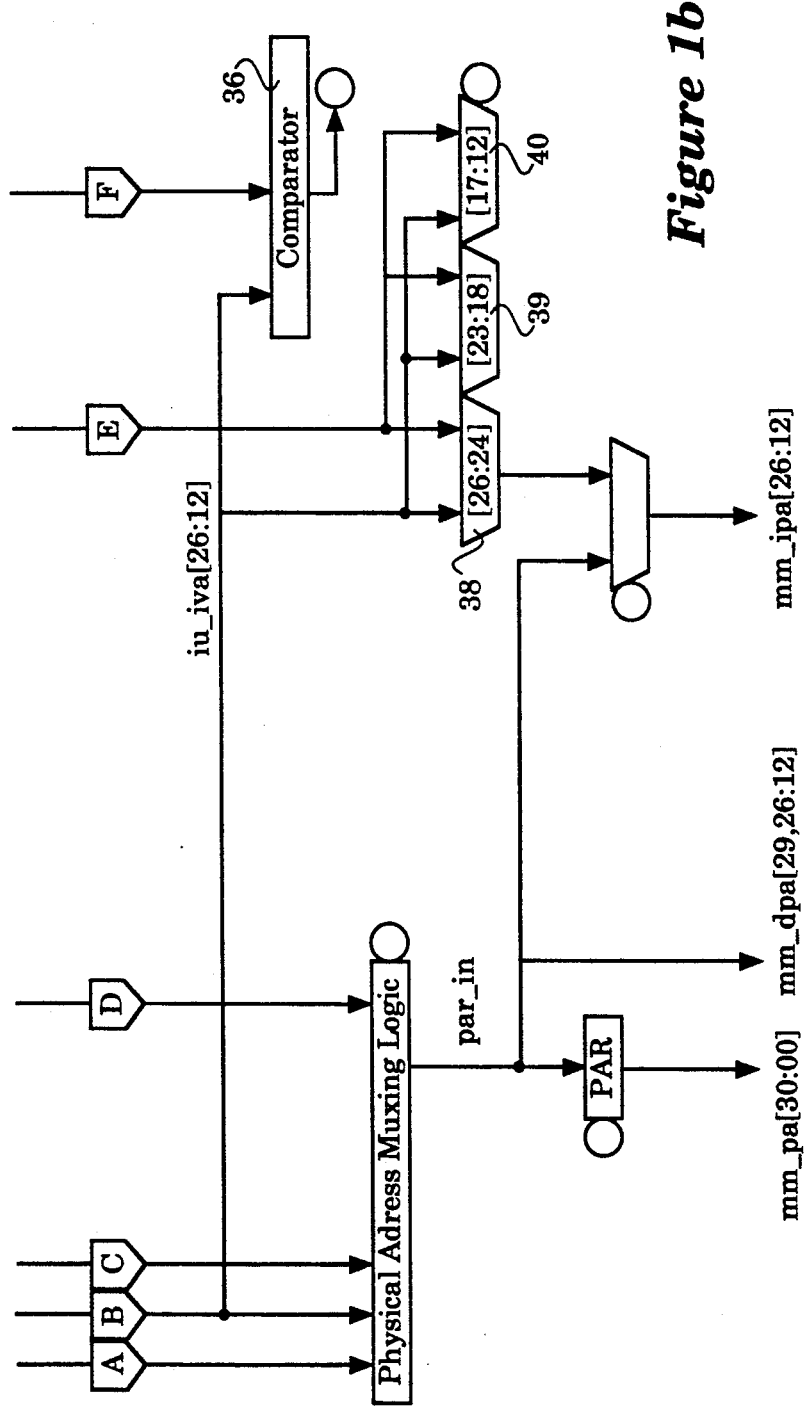

Referring now to FIGS. 1(a) and 1(b), there is illustrated a translation lookaside buffer 10 designed in accordance with the above-described patent application. The translation lookaside buffer 10 is a single relatively large cache of virtual address and their associated physical addresses. The translation lookaside buffer 10 is utilized in a reduced instruction set computer (RISC) system which has both a data cache and an instruction cache and refers to both concurrently. The translation lookaside buffer 10 is the only such buffer in the system and thus stores addresses for both data and instructions. Moreover, in order to enhance the speed of operation and reduce the hardware complexity of the system, this same translation lookaside buffer stores addresses used for input/output operations. Because a single translation lookaside buffer translates all of these addresses, the overall speed of address translation is substantially increased; and the area utilized for translation is substantially reduced. However, this particular architecture creates one problem which might otherwise slow the operation of translation.

Typically in a RISC machine an instruction is accessed every cycle so that there is, in effect, a stream of instructions. To provide these instructions, there is necessarily a stream of instruction addresses. At the same time, about twenty-five percent of the instructions (generally load and store instructions) require data from memory or store data into memory. These, of course, are accessed through data addresses. In addition, in the system for which the translation lookaside buffer was designed, there is about one input/output address translation required for every ten instruction address translations. In this particular machine, instruction address translations have the lowest priority, data address translations have the next priority, and input/output address translations have the highest priority. When the translation lookaside buffer is tied up handling a data or input/output address translation, an instruction address translation is delayed and must be rerouted to the translation lookaside buffer on the next available cycle. Since in a RISC computer, an instruction address is expected to be translated each clock cycle, this slows the operation of the system by a relatively substantial amount since, in total, interference from the translation of other addresses will occur about one-third of the time.

In order to obviate this problem, the present invention provides a single register (called an instruction translation buffer register) which stores a single row of the translation lookaside buffer. The register maintains a virtual address and an associated physical address. The register is updated after each instruction address translation is accomplished by the translation lookaside buffer.

If the translation lookaside buffer is tied up by the translation of a data address or an input/Output address and is unable to handle an instruction address translation, the instruction address is presented to the register for translation by the register and associated logic. The instruction translation buffer register contains the physical page address of the last instruction which was translated. Because of the locality of instructions in a program (they tend to come from the same page), it is quite likely that the high bits of the virtual address being sought are identical to the high level virtual bits in the register and thus that the new virtual address will match the last. In fact, the instruction translation buffer register has been found to hold the physical address desired over ninety percent of the time. Consequently, the instruction address and a data address may be translated in parallel and the speed of operation of the machine maintained.

In the translation lookaside buffer 10 illustrated in FIGS. 1(a) and 1(b), the virtual address sought by the system is presented on one of three sets of input lines 14, 15, or 16. The address presented on the lines 14 is furnished by the input/output circuitry of the computer system. The address presented on the lines 15 is an instruction address furnished by the integer processor of the computer system. The address presented on the lines 16 is a data address furnished by the integer processor of the computer system. In each case, the highest twenty bits of the virtual address sought are furnished to a portion 12 for comparison with the addresses stored therein. The particular virtual address is furnished to the virtual tag section by a multiplexer 18 in response to a control signal designating the particular type of information sought. For example, an instruction in the integer processor designates the information sought as data or an instruction while the input/output circuitry indicates that the information sought is for input/output purposes.

At the same time as the high order bits of the virtual address are presented to the multiplexor 18, a multiplexor 20 furnishes a context tag which is compared with the values in six context tag bit positions. The context tag is furnished from a context register CXR 19 and is a value written by the memory management software. For both a data address and an instruction address, both the virtual address tag and the context tag must match the bits sought for there to be a hit in the translation lookaside buffer 10. The context tag is a group of bits which allows the system to select among a plurality of different groups of page tables which are used with different software programs. For any particular program being run on a system, the context tag remains the same throughout the program. For the purposes of this invention, the context tag may be considered to be additional address bits.

When the virtual address bits and the context bits match the bits stored in the virtual tag and context fields of the portion 12 (and presuming in the preferred embodiment that certain other bits match), the high order bits of a physical address are provided as output. These high order bits of each physical address have been previously stored in a portion 22 of the translation lookaside buffer 10 in the same row as the virtual address from which they are to be translated. These high order bits provide a physical page number from which a physical address may be obtained. The low order bits of the virtual address and the physical address are the same and indicate the byte address within any particular page. Thus, the low order bits of the virtual address are combined with the physical page number, to provide a complete physical address.

As may be seen in FIGS. 1(a) and 1(b), when the multiplexors 18 and 20 and the portions 12 and 22 of the translation lookaside buffer 10 are being used to translate one virtual address to a physical address, they are unavailable to translate another virtual address until the first translation has been completed. If the translation occurs in the translation lookaside buffer 1 0, the loss of time may be a single clock cycle. If translation through the page lookup tables is required, on the other hand, the loss of time may be much greater. Since both input/output and data address translation have priority in the translation lookaside buffer 1 0, each instruction address translation occurring simultaneously with a data or input/output address translation would have to be delayed in the absence of the present invention.

In order to obviate the delay caused by simultaneously occurring address translations, the instruction translation buffer register 30 is provided. The register 30 includes a number of bit positions sufficient to store the pertinent information from a row of the translation lookaside buffer 10. On every instruction address translation through the translation lookaside buffer 1 0, the register 30 receives the instructional virtual address and its associated physical page address from the portions 12 and 22 of the translation lookaside buffer 10 as the translation of that instruction virtual address occurs. It may be seen that the bits of the virtual tag portion of the address are provided by the portion 12 via a series of conductors 32 while the bits of the physical page address portion of the address are provided by the portion 22 via a series of conductors 34. This information is then in the register 30 when the next instruction virtual address appears for translation.

When the next instructional virtual address appears for translation, it is translated in the primary cache portions 12 and 22 of the translation lookaside buffer 10 so long as those portions this usual situation, the new instructional virtual address and its associated physical page address are placed in the register 30. However, when a instruction virtual address cannot be translated in the primary cache of the translation lookaside buffer 10 because of another address translation having priority, the instruction virtual address on lines 15 vying for translation is transferred to a comparator 36. The comparator 36 compares the virtual address of the instruction sought with the last instructional virtual address stored in the register 30. Since only the high order bits of the virtual address (those which translate to a particular page of the page tables) are required for the comparison and since instructions tend to appear very close to one another in memory, it is very likely that the present instruction will have the same page address as did the last instruction. If so, a hit is signalled by the comparator 36.

On the occurrence of a hit, one or more of three multiplexors 38, 39, or 40 is caused to transfer the physical page address to the processor for use. The particular combination of the multiplexors 38, 39, or 40 selected to transfer the address will depend of the size of the page being translated and has no significance so far as the present invention is concerned. In this manner, the instruction address and the data or input/output address may both be translated at the same time so that no delay in the pipeline of the processor occurs.

In the unusual case in which an instruction virtual address does not match the virtual address in the register 30, the failure to match is signalled to a state machine (not shown) at the output of the comparator 36. The state machine in response to this signal causes the instructional virtual address to be retried at the translation lookaside buffer 10 at the next available time after the translation being processed. Since a miss is found to occur less than ten percent of the time and interference with the translation of an instruction virtual address occurs only about one third of the time, this delay will occur on an average less than once in every thirty instructions. As will be understood by those skilled in the art, this substantially increases the speed of operation of the system. More importantly, it does this without increasing the amount of hardware by any significant amount. Consequently, the system is able to be placed in the smallest possible area of silicon.

Although the present invention has been described in terms of a preferred embodiment, it will be appreciated that various modifications and alterations might be made by those skilled in the art without departing from the spirit and scope of the invention. For example, an arrangement using a register for caching where parallel inputs interfere might be used in other circumstances than those suggested above. A graphics controller for three dimensional graphics might use a cache for Z access coordinates yet be required to deal with X and Y access coordinates occasionally. In order to keep processing at the same speed, a single cache-entry register might be used to reduce interference between simultaneously occurring coordinates. Other small parallel caching arrangement with a high degree of locality might similarly benefit from the invention. The invention should therefore be measured in terms of the claims which follow.

What is claimed is:

1. A translation lookaside buffer for caching virtual addresses for data and instructions along with physical addresses associated with the virtual addresses wherein virtual addresses for instructions and data may appear substantially simultaneously and require translation into physical addresses, comprising:
   a primary cache for storing a plurality of individual virtual addresses and associated physical addresses;
   register means for storing a single instruction virtual address and its associated physical address each time an instruction virtual address and an associated physical address is referenced in the primary cache; and
   determination means for ascertaining whether the single virtual address held in the register means is a virtual address sought when an attempt is made to access the primary cache for a physical address with two virtual addresses received at substantially the same time.

2. A translation lookaside buffer as claimed in claim 1 in which the register means comprises:
   a register for storing a single row of the primary cache; and
   means for filling the register with information from a row of the primary cache containing the instruction virtual address sought each time a virtual address instruction reference occurs.

3. A translation lookaside buffer as claimed in claim 1 in which the determination means comprises means for comparing the instruction virtual address sought and the instruction virtual address stored in the register means.

4. A translation lookaside buffer as claimed in claim 1 further comprising means responsive to a determination by said determination means that said single virtual address held in the register means is not the virtual address sought, for reacessing the primary code with the sought instruction virtual address.

5. A translation lookaside buffer for use with a computer having a memory, said buffer comprising:
   a primary cache storing a plurality of entries, each entry including a virtual memory address, a corresponding physical memory address, and a copy of data stored by said memory at said corresponding physical address;
   a register for storing a single entry of said primary cache; and
   means for accessing said entries within said primary cache with virtual memory addresses to retrieve said data corresponding to said virtual memory addresses; with
   said means for accessing said primary cache including means for accessing said register with a first virtual address while substantially simultaneously accessing the primary cache with a second virtual address, such that access to data corresponding to said first virtual address is not substantially delayed pending completion of access to said primary cache with said second virtual address.

6. A translation look-aside buffer fore use with a computer having a memory, said buffer comprising:
   a primary cache storing a plurality of entries, each entry including a virtual memory address, a corresponding physical memory address, and a copy of information stored by said memory at said corresponding physical address, with said physical address for each of said entries being one of an instruction address, a data address, and a input/output address;
   a register for storing a single entry of said primary cache corresponding to an instruction address; and
   means for accessing said entries within said primary cache with virtual memory addresses to retrieve said information corresponding to said virtual memory addresses, said means for accessing said primary cache giving a lowest priority to instruction addresses; with
   said means for accessing said primary cache including means for accessing said register with a virtual address of an instruction while substantially simultaneously accessing the primary cache with a higher priority virtual address, such that access to information corresponding to said virtual address of said instruction is not substantially delayed pending completion of access to said primary cache with said higher priority virtual address.

7. In a computer system having a translation lookaside buffer including a primary cache for caching virtual memory addresses and corresponding data, and having means for accessing said primary cache with virtual memory addresses to retrieve said corresponding data, wherein said means for accessing is incapable of accessing said primary cache with two virtual memory address at substantially the same time, an improvement comprising:
   a register means for storing a single virtual memory address from said primary cache along with corresponding data; and
   means for accessing said register means with one virtual memory address while said means for accessing said translation lookaside buffer substantially simultaneously accesses said primary cache with another virtual memory address.

* * * * *

UNITED STATES PATENT AND TRADEMARK OFFICE
CERTIFICATE OF CORRECTION

PATENT NO. : 5,305,444
DATED : April 19, 1994
INVENTOR(S) : Becker et al.

It is certified that error appears in the above-identified patent and that said Letters Patent is hereby corrected as shown below:

In column 7, claim 4 at line 65, please delete " code " and insert -- cache --.

In column 8, claim 6 at line 22, please delete "fore" and insert -- for --.

Signed and Sealed this

Twenty-third Day of December, 1997

*Attest:*

BRUCE LEHMAN

*Attesting Officer*  Commissioner of Patents and Trademarks